United States Patent
Harvey et al.

(10) Patent No.: US 10,017,169 B1
(45) Date of Patent: Jul. 10, 2018

(54) CONTROLLING AN ELECTRIC BRAKE OF A UTILITY VEHICLE WHICH HAS A LITHIUM BATTERY MANAGEMENT SYSTEM

(71) Applicant: Textron Innovations Inc., Providence, RI (US)

(72) Inventors: Arthur James Harvey, Beech Island, SC (US); Norman R. Padgett, Evans, GA (US); John Ledden, Augusta, GA (US); Robert Charles Bradley, Augusta, GA (US); Patrick Dwaine Warden, Grovetown, GA (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 15/395,249

(22) Filed: Dec. 30, 2016

(51) Int. Cl.
| | |
|---|---|
| *B60L 7/12* | (2006.01) |
| *B60L 11/18* | (2006.01) |
| *B60L 7/16* | (2006.01) |
| *H02P 3/14* | (2006.01) |
| *B60T 13/74* | (2006.01) |

(Continued)

(52) U.S. Cl.
CPC .............. *B60T 13/748* (2013.01); *B60L 7/10* (2013.01); *B60L 11/1818* (2013.01); *B60L 11/1859* (2013.01); *B60L 11/1861* (2013.01); *B60L 11/1877* (2013.01); *B60T 7/045* (2013.01); *B60L 2200/22* (2013.01); *B60L 2240/30* (2013.01); *B60T 2270/89* (2013.01); *B60Y 2200/23* (2013.01); *B60Y 2400/112* (2013.01)

(58) Field of Classification Search
CPC ............... B60L 7/12; B60L 3/14; B60T 13/11
See application file for complete search history.

(56) References Cited

U.S. PATENT DOCUMENTS

| | | | |
|---|---|---|---|
| 5,934,051 A | 8/1999 | Hahn | |
| 6,885,535 B2 | 4/2005 | Hummert et al. | |

(Continued)

FOREIGN PATENT DOCUMENTS

| | | |
|---|---|---|
| EP | 1655830 | 5/2006 |
| WO | 20130006949 | 1/2013 |

OTHER PUBLICATIONS

Garia, "Introducing the New Garia Golf", http://www.garia.com/news/introducing-the-new-garia-golf/, Sep. 15, 2016.

*Primary Examiner* — Bentsu Ro
*Assistant Examiner* — Said Bouziane
(74) *Attorney, Agent, or Firm* — BainwoodHuang

(57) ABSTRACT

A motion control system controls movement of a utility vehicle. The motion control system includes an electric brake that (i) provides mechanical resistance which inhibits a motor of the utility vehicle from turning when the electric brake is unpowered and (ii) removes the mechanical resistance to allow the motor of the utility vehicle to turn when power is provided to the electric brake. The motion control system further includes a lithium BMS having a contactor that closes to provide electrical access to a lithium battery and opens to remove electrical access to the lithium battery. The motion control system further includes control circuitry coupled with the electric brake and the lithium BMS. The control circuitry directs the lithium BMS to maintain closure of the contactor to provide power from the lithium battery to the electric brake in response to receipt of a tow signal.

19 Claims, 11 Drawing Sheets

(51) Int. Cl.
   *B60T 7/04*   (2006.01)
   *B60L 7/10*   (2006.01)

(56) References Cited

U.S. PATENT DOCUMENTS

| | | | |
|---|---|---|---|
| 7,332,881 | B2 | 2/2008 | Clark et al. |
| 7,560,882 | B2 | 7/2009 | Clark et al. |
| 7,778,746 | B2 | 8/2010 | McLeod et al. |
| 7,800,345 | B2 | 9/2010 | Yun et al. |
| 7,825,616 | B2 | 11/2010 | Clark et al. |
| D652,349 | S | 1/2012 | Kristensen |
| 8,120,291 | B2 | 2/2012 | Clark et al. |
| 8,596,391 | B2 | 12/2013 | Kshatriya |
| 8,604,749 | B2 | 12/2013 | Kwag et al. |
| 8,714,572 | B1 | 5/2014 | Singletary et al. |
| 9,050,899 | B2 | 6/2015 | Seol |
| 9,190,782 | B2 | 11/2015 | King et al. |
| 9,199,546 | B2 | 12/2015 | King |
| 9,225,183 | B2 | 12/2015 | King |
| 9,371,067 | B2 | 6/2016 | Dao et al. |
| 9,387,775 | B2 | 7/2016 | Baek et al. |
| 9,436,261 | B2 | 9/2016 | Yun |
| 9,508,982 | B2 | 11/2016 | Kim et al. |
| 9,553,460 | B2 | 1/2017 | Dao et al. |
| 9,592,743 | B2 | 3/2017 | Haug |
| 9,595,847 | B2 | 3/2017 | Dao et al. |
| 9,806,341 | B2 | 10/2017 | Lee et al. |
| 9,806,545 | B2 | 10/2017 | Fink |
| 2002/0030405 | A1 | 3/2002 | Harner et al. |
| 2008/0099603 | A1 | 5/2008 | Yamamoto et al. |
| 2013/0241502 | A1 | 9/2013 | Sowden |
| 2017/0182897 | A1* | 6/2017 | Wang ............... B60L 11/1814 |
| 2017/0190335 | A1* | 7/2017 | Gillett ............... B60W 50/082 |
| 2017/0267105 | A1* | 9/2017 | Fratelli ............... B60L 7/12 |

\* cited by examiner

US 10,017,169 B1

CONTROLLING AN ELECTRIC BRAKE OF A UTILITY VEHICLE WHICH HAS A LITHIUM BATTERY MANAGEMENT SYSTEM

BACKGROUND

Some conventional electric vehicles are equipped with electromagnetic parking brakes that normally remain in braked positions to prevent the electric vehicles from rolling inadvertently. When power is provided to the electromagnetic parking brakes (e.g., in response to human operators pressing on accelerator pedals), the electromagnetic parking brakes release thereby allowing electric motors of the electric vehicles to move the electric vehicles.

A particular conventional electric vehicle includes a parking brake release lever that electrically connects a lead acid battery of the electric vehicle to an electromagnetic parking brake of the electric vehicle. When a human operator moves the parking brake release lever from the "braked" position to the "released" position, such operation results in delivery of power from the lead acid battery to the electromagnetic parking brake. The electromagnetic parking brake disengages in response to power from the lead acid battery thus enabling the electric vehicle to roll freely, e.g., allowing the electric vehicle to be towed without being impeded by the electromagnetic parking brake.

SUMMARY

It should be understood that there are deficiencies to the above-described conventional approach to electrically connecting a lead acid battery of an electric vehicle to an electromagnetic parking brake of the electric vehicle to release the electromagnetic parking brake. In particular, the above-described conventional approach is unsuitable for an electric vehicle that uses power from a lithium battery. Along these lines, suppose that a human operator simply replaces the lead acid battery of the electric vehicle with a lithium battery and then moves the parking brake release lever from the "braked" position to the "released" position to release the electromagnetic parking brake using power from the lithium battery. If the human operator forgets to move the lever from the "released" position back to the "braked" position, the lithium battery will remain electrically connected to the electromagnetic parking brake and continue to discharge. Unfortunately, once a lithium battery has become over-discharged, subsequent recharging may make the lithium battery unstable.

Improved techniques are directed to electronically controlling a lithium battery management system (BMS) of a utility vehicle in response to a tow signal (or condition). Such a tow signal may be provided when a user switches a brake release switch from a "normal" position to a "brake release" position and motion of the utility vehicle is routinely sensed. In particular, in response to such a tow signal, control circuitry in accordance with some embodiments may direct the lithium BMS to close its contactor thus providing power from a lithium battery to an electric brake of the utility vehicle. With power available from the lithium battery, the control circuitry releases (or disengages) the electric brake thus enabling the utility vehicle to move without resistance from the electric brake (e.g., to be towed). If the control circuitry of some such embodiments does not detect vehicle motion for a predefined amount of time, the control circuitry may direct the lithium BMS to open its contactor thus terminating power from the lithium battery to the electric brake causing the electric brake to re-engage. With the contactor now open, there is no further discharging of the lithium battery. As a result, such operation robustly and reliably prevents the lithium battery from becoming over-discharged thus safeguarding the lithium battery against becoming unstable.

One embodiment is directed to a motion control system that controls movement of a utility vehicle. The motion control system includes an electric brake configured to (i) provide mechanical resistance which inhibits a motor of the utility vehicle from turning when the electric brake is unpowered and (ii) remove the mechanical resistance to allow the motor of the utility vehicle to turn when power is provided to the electric brake. The motion control system further includes a lithium battery management system (BMS) having a contactor configured to close to provide electrical access to a lithium battery and open to remove electrical access to the lithium battery. The motion control system further includes control circuitry coupled with the electric brake and the lithium BMS. The control circuitry is configured to direct the lithium BMS to maintain closure of the contactor to provide power from the lithium battery to the electric brake in response to receipt of a tow signal.

In some arrangements, the control circuitry is constructed and arranged to: while receiving the tow signal, (i) sense whether the utility vehicle is in motion and (ii) direct the lithium BMS to open the contactor after a predefined amount of time elapses without sensing motion of the utility vehicle.

In some arrangements, the control circuitry includes a motion sensor, a timer constructed and arranged to expire upon reaching the predefined amount of time, and control logic coupled with the motion sensor and the timer. While the control logic receives the tow signal, the control logic is configured to reset the timer upon sensing motion of the utility vehicle via the motion sensor, output a first control signal to the lithium BMS while the timer has not expired, and output a second control signal to the lithium BMS when the timer has expired, the second control signal being different from the first control signal.

Another embodiment is directed to a utility vehicle which includes a utility vehicle body, a lithium battery supported by the utility vehicle body, a motor supported by the utility vehicle body, and a motion control system configured to control movement of a utility vehicle. The motion control system includes:

(A) an electric brake configured to (i) provide mechanical resistance which inhibits the motor from turning when the electric brake is unpowered and (ii) remove the mechanical resistance to allow the motor to turn when power is provided to the electric brake, (B) a lithium battery management system (BMS) having a contactor configured to close to provide electrical access to the lithium battery and open to remove electrical access to the lithium battery, and (C) control circuitry coupled with the electric brake and the lithium BMS, the control circuitry being configured to direct the lithium BMS to maintain closure of the contactor to provide power from the lithium battery to the electric brake in response to receipt of a tow signal.

Yet another embodiment is directed to a method of controlling lithium battery access which is performed in a utility vehicle. The method includes:

(A) signaling a lithium battery management system (BMS) to provide an electric brake with electrical access to a lithium battery of the utility vehicle in response to a tow signal from a tow switch of the utility vehicle, the electric brake being configured to (i) provide mechanical resistance which inhibits a motor of the utility vehicle from turning when the electric brake is unpowered and (ii) remove the mechanical resistance to allow the motor of the utility vehicle to turn when power is provided to the electric brake;
(B) signaling the lithium BMS to continue providing electrical access to the lithium battery of the utility vehicle while sensing motion of the utility vehicle; and
(C) signaling the lithium BMS to discontinue providing electrical access to the lithium battery when no motion of the utility vehicle has been sensed for a predefined amount of time.

Other embodiments are directed to higher and lower level systems, assemblies, apparatus, processing circuits, etc. Some embodiments are directed to various processes, electronic components and circuitry which are involved in controlling an electric brake of a utility vehicle which has a lithium BMS.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to electronically controlling a lithium battery management system (BMS) of a utility vehicle in response to a tow signal or condition. Such a tow signal may be provided when a user switches a brake release switch from a "normal" position to a "brake release" position and motion of the utility vehicle is routinely sensed. In particular, in response to such a tow signal, control circuitry in accordance with some embodiments directs the lithium BMS to close its contactor thus providing power from a lithium battery to an electric brake of the utility vehicle. With power available from the lithium battery, the control circuitry releases (or disengages) the electric brake thus enabling the utility vehicle to move without resistance from the electric brake (e.g., to be towed). If the control circuitry of some such embodiments does not detect vehicle motion for a predefined amount of time, the control circuitry directs the lithium BMS to open its contactor thus terminating power from the lithium battery to the electric brake causing the electric brake to re-engage. With the contactor now open, there is no further discharging of the lithium battery. Accordingly, such operation robustly and reliably prevents the lithium battery from becoming over-discharged thus safeguarding the lithium battery against becoming unstable.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
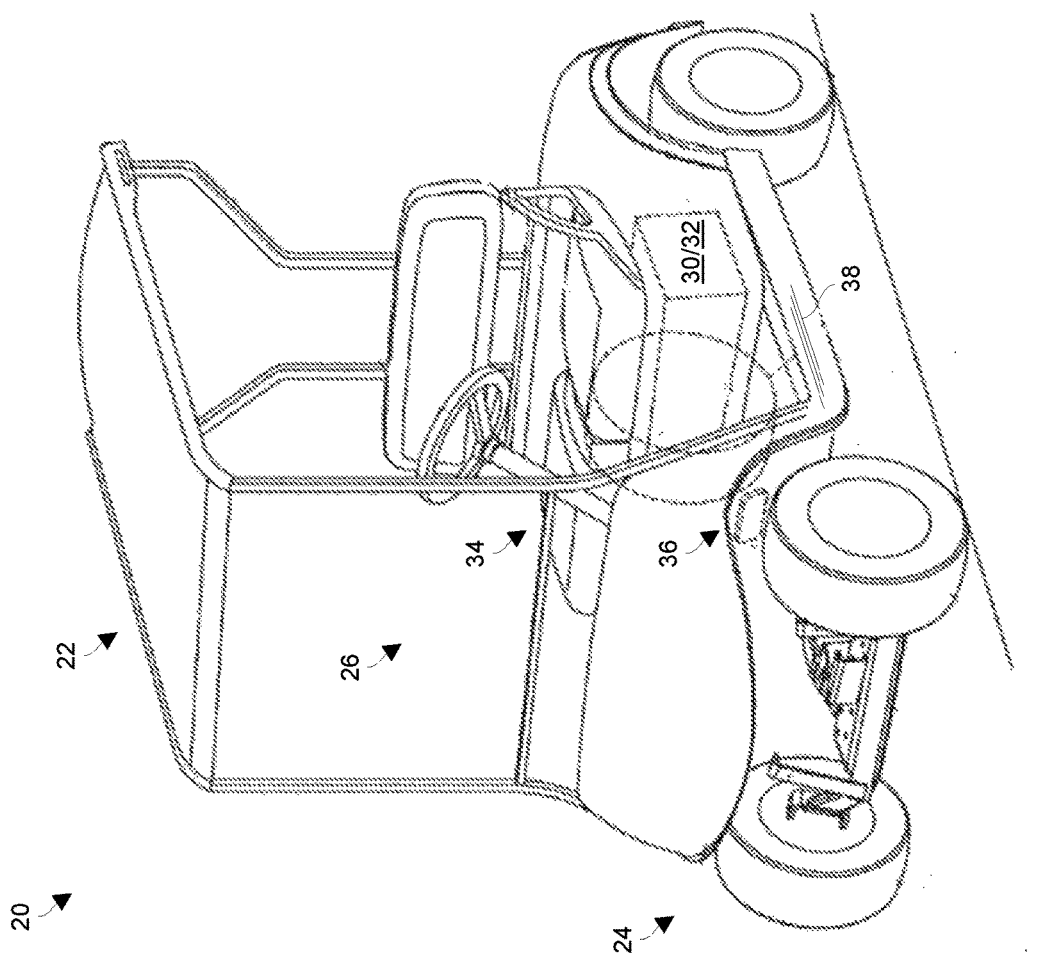
FIG. 1 is a perspective view of an example utility vehicle which controls electrical access to a lithium battery.

FIG. 1 shows an example utility vehicle 20 which controls electrical access to a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a lithium battery system 32, and additional components 34 such as a set of user controls 36 (e.g., a brake release switch, a foot pedal, a keyed switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging. Further details will now be provided with reference to FIGS. 2 and 3.

Figure 2:
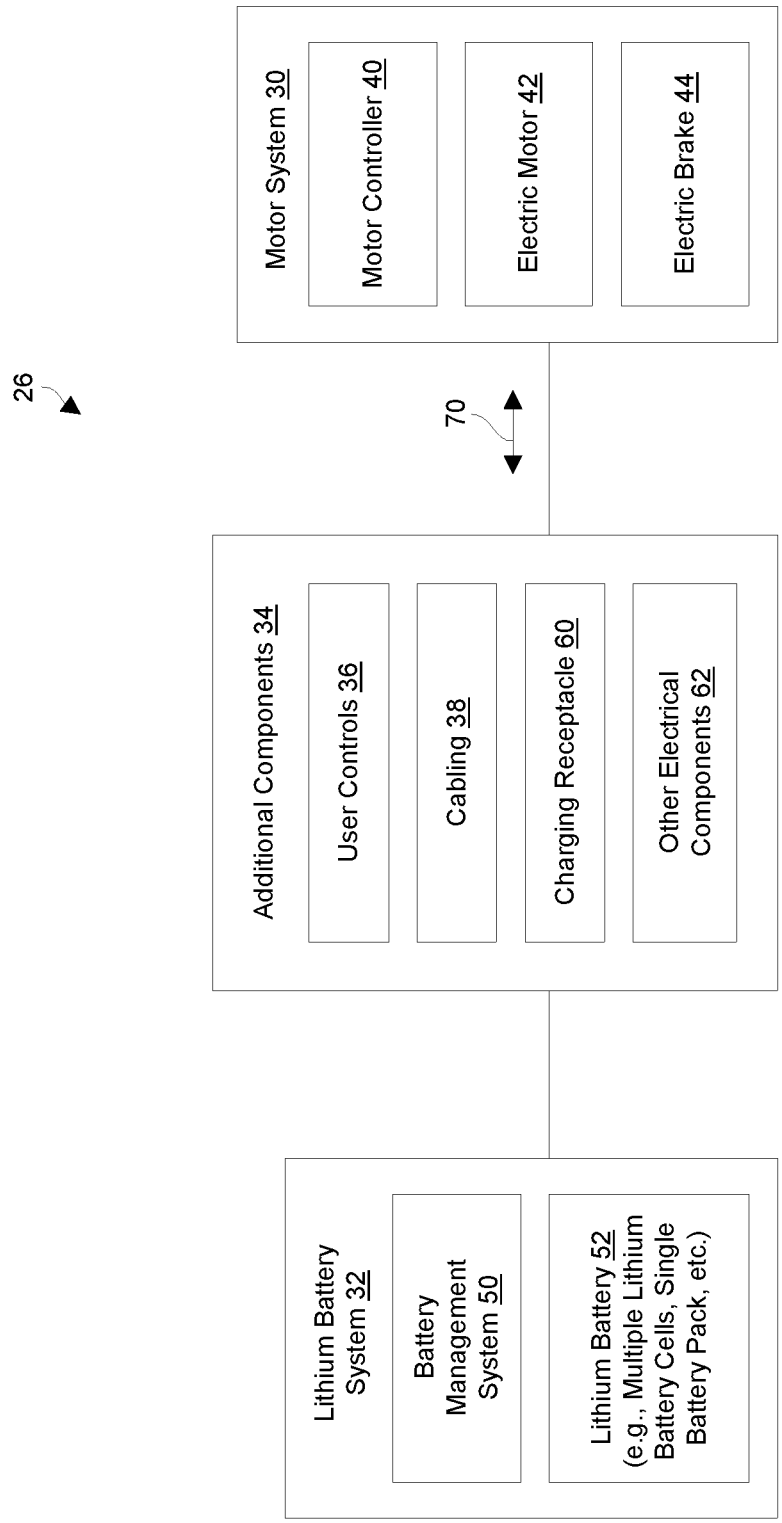
FIG. 2 is a block diagram of particular systems and components of the utility vehicle of FIG. 1 in accordance with some example embodiments.
Figure 3:
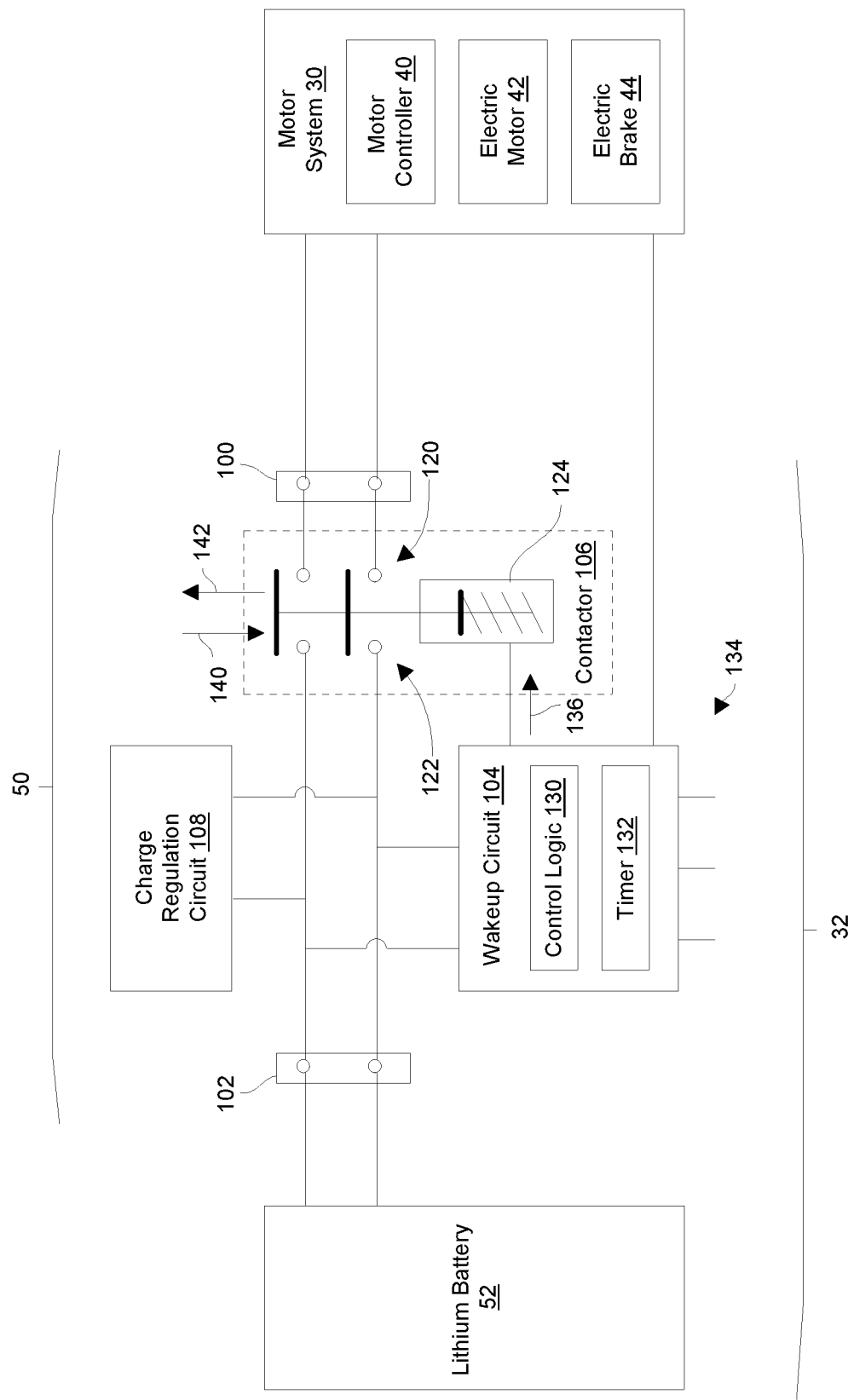
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40, an electric motor 42 which is linked to the set of tires 24 (FIG. 1), and an electric brake 44 coupled with the electric motor 42. The motor controller 40 of some embodiments controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (i.e., the utility vehicle 20 is awake but a user is not pressing on the accelerator pedal, the utility vehicle 20 is turned off, etc.), the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events such as sleep events (e.g., timeouts) to prevent excessive discharging of the lithium battery 52 thus safeguarding the lithium battery 52 from becoming over discharged. In some embodiments, the BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging receptacle 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during discharging and charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
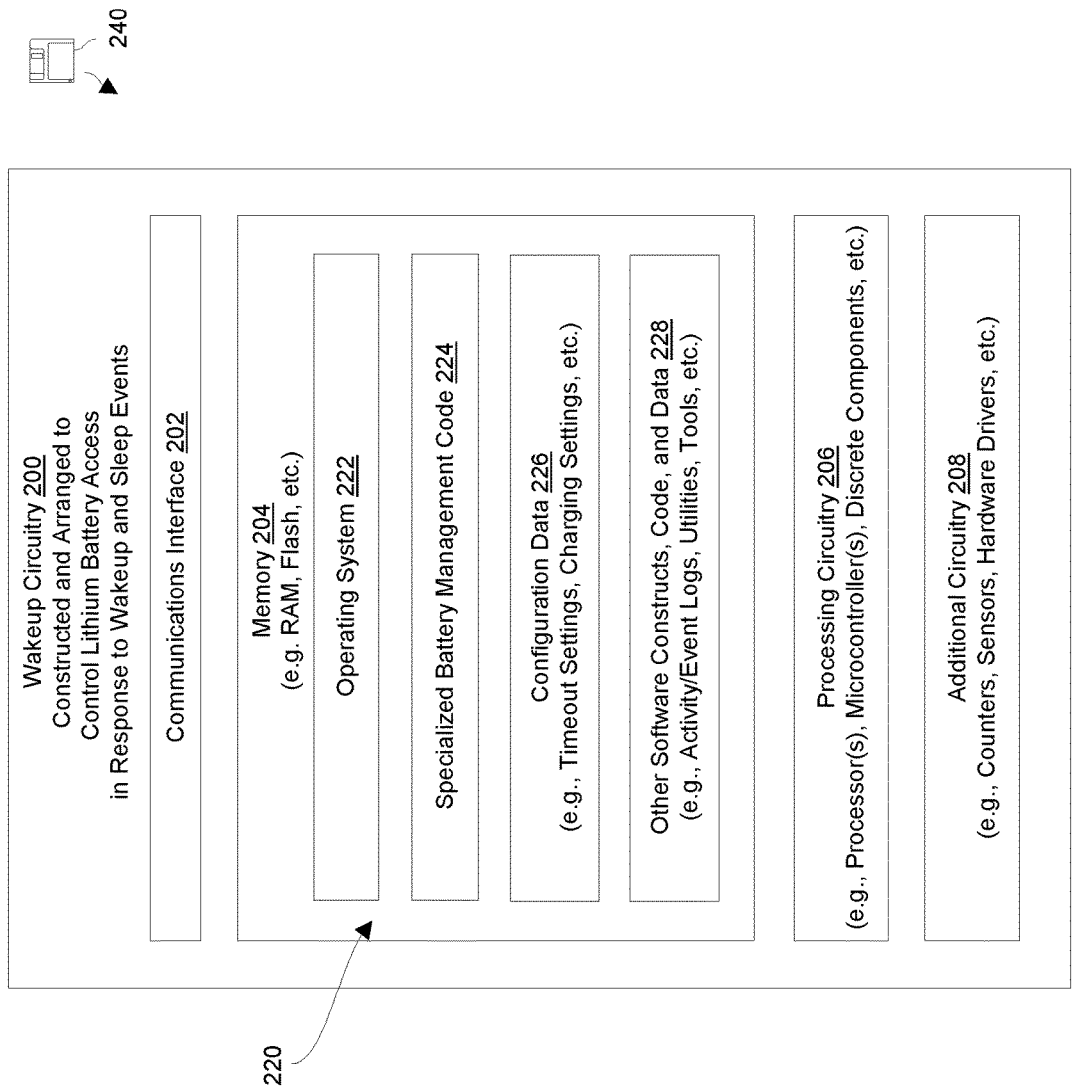
FIG. 4 is a block diagram of particular details of a wakeup circuit of a battery management system of the utility vehicle of FIG. 1 in accordance with some example embodiments.
Figure 5:
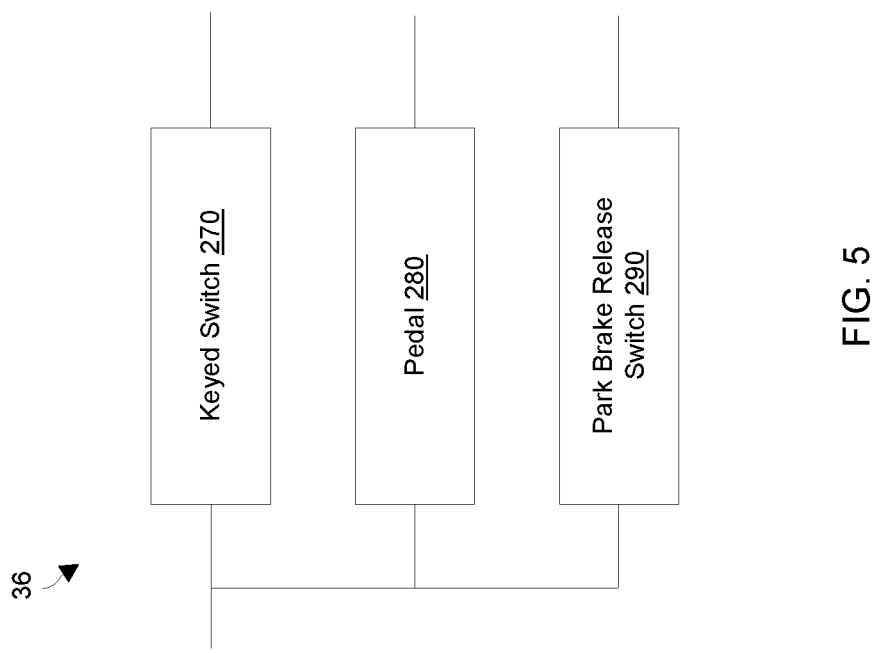
FIG. 5 is a block diagram of particular user controls that provide input to the wakeup circuit of FIG. 4 in accordance with some example embodiments.

FIGS. 4 through 5 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on. In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, the user controls 36 includes a keyed switch 270, and an accelerator (or throttle) pedal 280, and a park brake release switch 290 which are electrically connected in parallel to the BMS 50 (also see FIG. 2). Such user controls 36 may communicate with the BMS 50 via the inputs 134 (FIG. 3). In some embodiments, other user controls 36 may communicate with the BMS 50 as well such as a brake pedal, a forward/reverse switch, and so on.

It should be understood the control logic 130 and the timer 132 of the wakeup circuit 104 (FIG. 3), which in some embodiments are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Now, suppose that the user turns the keyed switch 270 (FIG. 5) from an OFF position to an ON position. In such a situation and in accordance with some embodiments, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which directs the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. The timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 expires by reaching the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep, the user is able to wake the BMS 50 by moving the keyed switch 270 to the ON position (another wakeup event). Likewise, in accordance with some embodiments, if the BMS 50 has fallen asleep and the keyed switch 270 is in the ON position, the user is able to wake the BMS 50 by actuating the pedal 280 (yet another wakeup event).

In some embodiments, while the BMS 50 is awake and the park brake release switch 290 is in a "normal" configuration and the keyed switch 270 is in the ON position, the control circuitry 250 of the motor system 30 only provides power to release (or disengage) the electric brake 44 when the user presses the pedal 280. Otherwise, if the keyed switch 270 is in the OFF position, the control circuitry 250 does not output power to the electric brake 44 and the electric brake 44 remains engaged. That is, the electric brake 44 continues to inhibit movement of the motor 42 (FIG. 3) so that the set of tires 24 of the utility vehicle 20 do not move freely and the utility vehicle 20 remains parked.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

As will be discussed in further detail later below and in accordance with some embodiments, the motor controller 40 (FIGS. 2 and 3) may be controlled by a separate tow switch to enable the utility vehicle 20 to be towed. Here, in accordance with some embodiments, the motor controller 40 (i) senses vehicle motion, (ii) routinely outputs special communications 70 (e.g., CAN messages) to the BMS 50 to keep the BMS 50 awake in response to the sensed vehicle motion, and (iii) conveys power to the electric brake 44 to disengage the electric brake 44 and allow the utility vehicle 20 to roll freely. Additionally, in some embodiments, the motor controller 40 starts (or restarts) an internal timer whenever the motor controller 40 senses motion of the utility vehicle 20. If the timer reaches a predefined idle time limit due to the absence of sensed motion for a predefined amount of time, the motor controller 40 directs the BMS 50 to go to sleep resulting in no further drain on the lithium battery 52. In this situation, the contactor 106 opens and electric brake 44 no longer receives power thus providing mechanical resistance to the motor 42 which holds the utility vehicle 20 in place.

Charging

Figure 6:
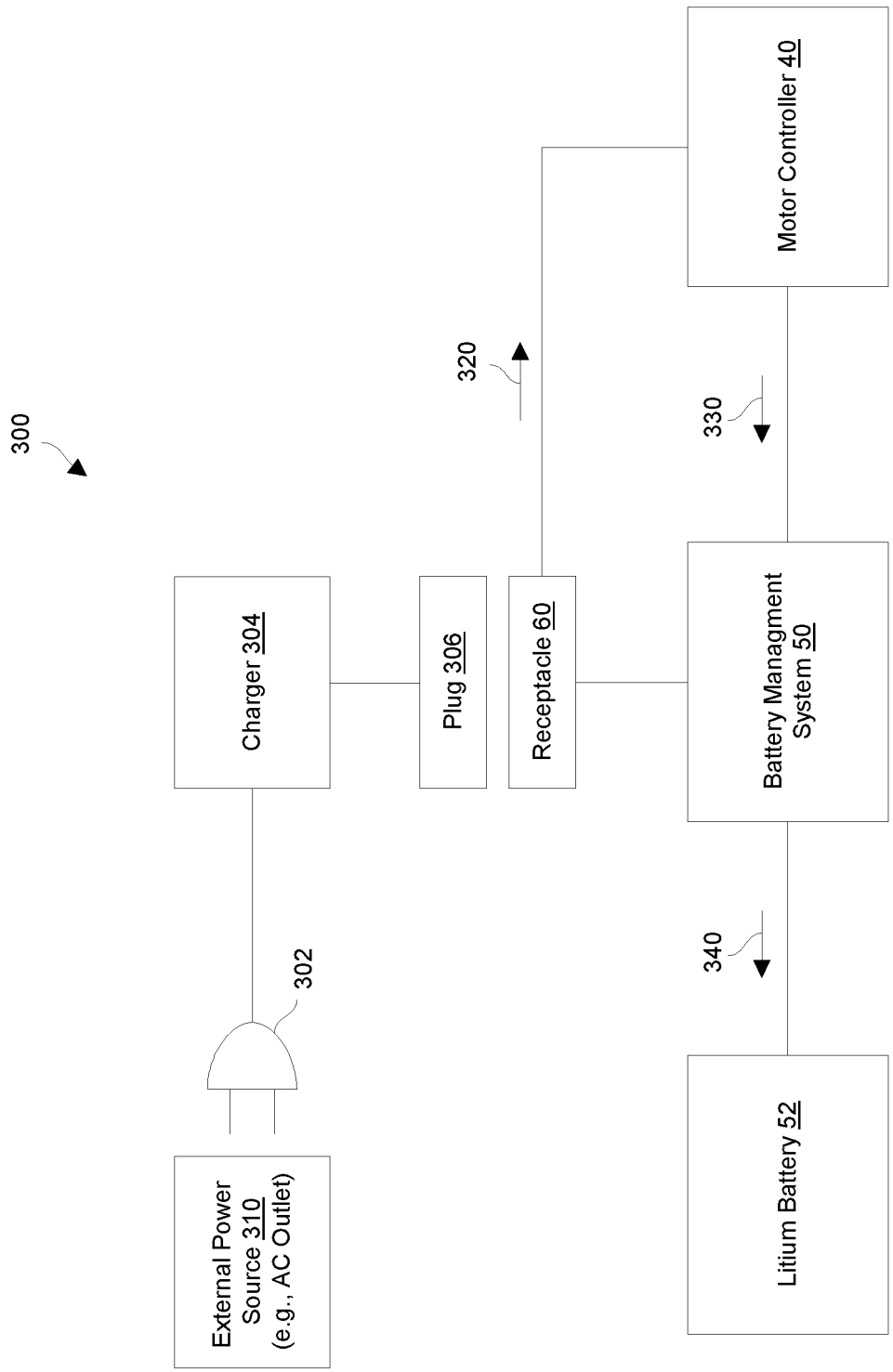
FIG. 6 is a block diagram of particular charging circuitry of the utility vehicle of FIG. 1 in accordance with some example embodiments.

FIG. 6 shows particular details of the charging circuitry 300 which charges the lithium battery 52 of the utility vehicle 20 (also see FIG. 1), in accordance with some example embodiments. In accordance with the embodiments illustrated in FIG. 6, the charging circuitry 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging receptacle 60 of the utility vehicle 20 (also see FIG. 2). The charger 304 is constructed and arranged to convert and condition a power signal from the external power source 310 for use by the utility vehicle 20.

As further shown in FIG. 6, the charging receptacle 60 electrically couples with the motor controller 40 and the battery management system (BMS) 50. Accordingly, when the receptacle 60 receives power from the charging circuitry 300, the receptacle 60 provides power to the motor controller 40 and BMS 50. In some embodiments, this initial power from the charging circuitry 300 wakes up the BMS 50 and the motor controller 40 (FIG. 3). In some embodiments, the receptacle 60 also provides an interlock signal 320 to the motor controller 40 which has also woken up. In response to the interlock signal 320, the motor controller 40 outputs a communication 330 (e.g., a CAN message) that informs the BMS 50 that the charging circuitry 300 is plugged in to the receptacle 60 and the BMS 50 then closes the contactor 106. With the contactor 106 now closed, the BMS 50 conveys a charging signal 340 from the charging circuitry 300 to the lithium battery 52. In some arrangements, the charge regulation circuit 108 (FIG. 3) conditions the charging signal 340 to properly charge the lithium battery 52.

While the lithium battery 52 charges in response to receipt of the charge signal 340 and in accordance with some embodiments, the BMS 50 monitors the lithium battery 52 to prevent overcharging. In particular, in response to sensing that the lithium battery 52 has charged to a predefined maximum charge threshold (or level), the BMS 50 deactivates the charge regulation circuit 108, e.g., sets the duty cycle of pulse width modulation (PWM) circuitry back to 0%, where other pulse widths determine different charging rates. In some arrangements, the BMS 50 then immediately goes to sleep. In other arrangements, the BMS imposes a timeout (e.g., 30 minutes) and goes to sleep if the timeout period expires without further user activity.

Additional Details

Figure 7:
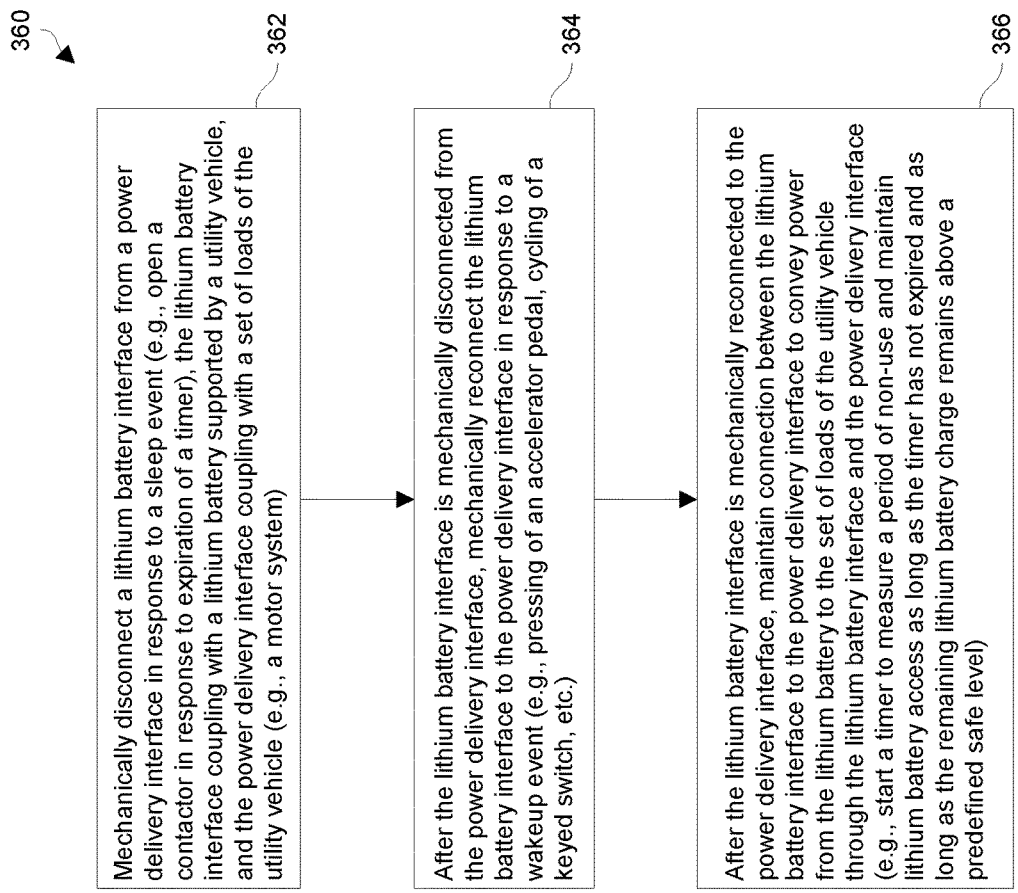
FIG. 7 is a flowchart of a procedure which is performed by the battery management system of the utility vehicle of FIG. 1 in accordance with some example embodiments.

FIG. 7 is a flowchart of a procedure 360 which is performed by the battery management system (BMS) 50 of the utility vehicle 20 to control access to the lithium battery 52 in accordance with some example embodiments.

At 362, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 364, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 366, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

Disengaging the Electric Brake and Towing

Figure 8:
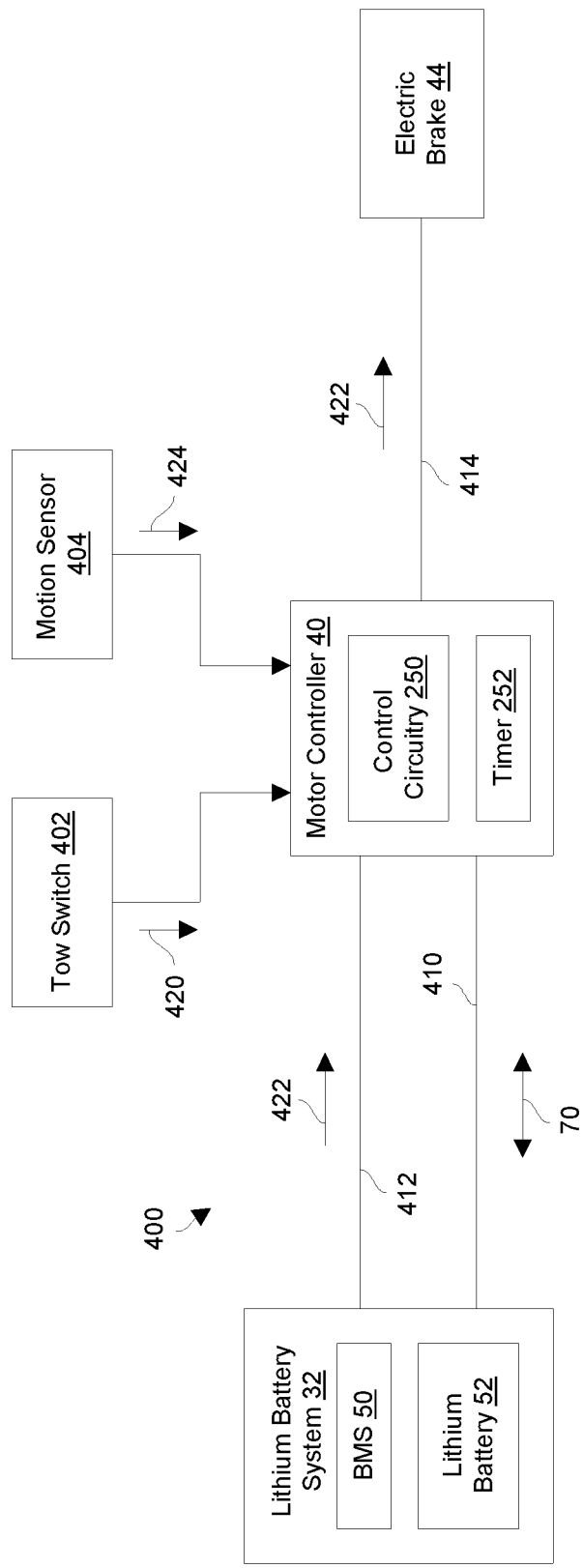
FIG. 8 is a block diagram of particular components of the utility vehicle during a first towing situation in accordance with some example embodiments.
Figure 9:
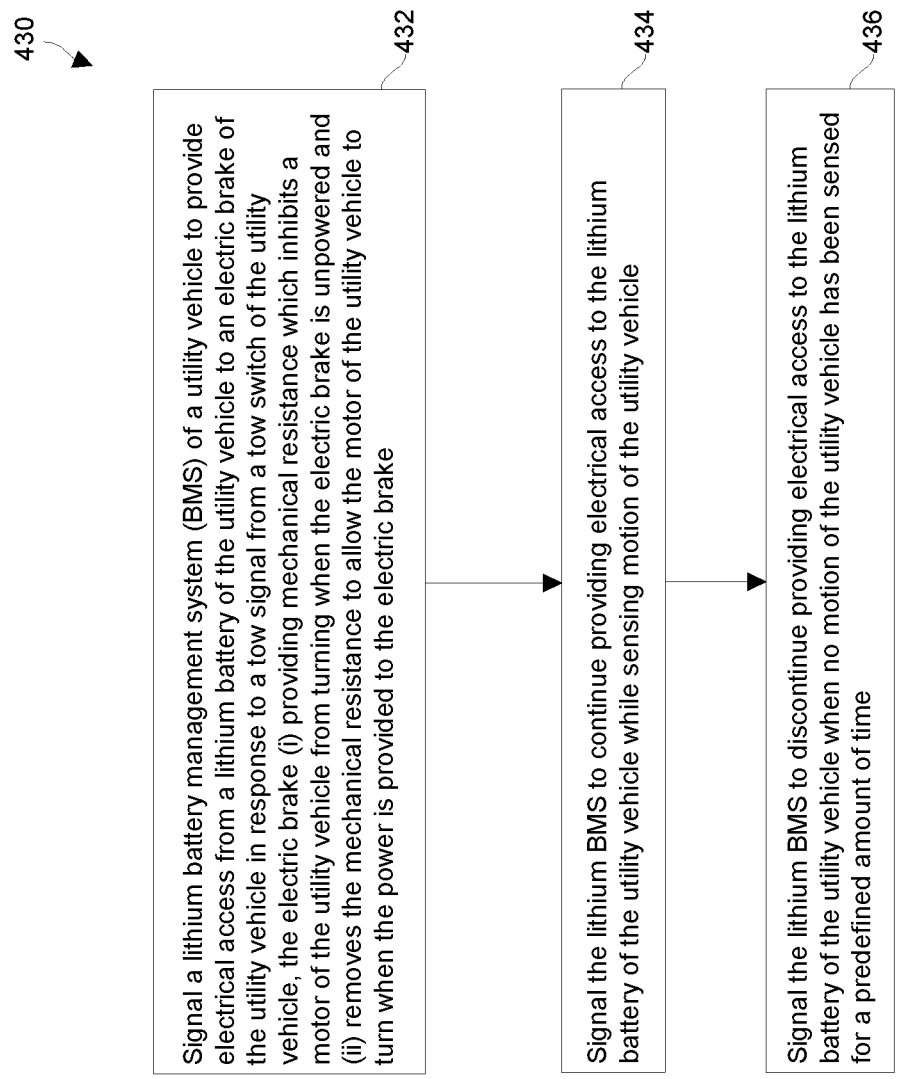
FIG. 9 is a flowchart of a procedure which is performed by particular components of the utility vehicle during the first towing situation in accordance with some example embodiments.
Figure 10:
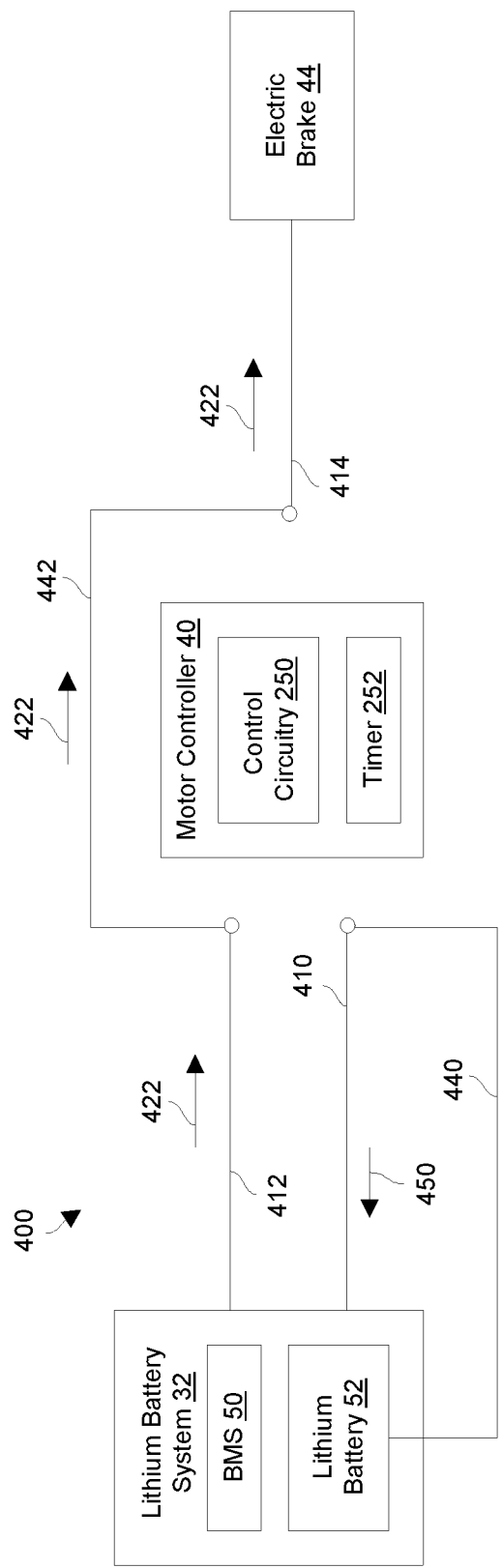
FIG. 10 is a block diagram of particular components of the utility vehicle during a second towing situation in accordance with some example embodiments.
Figure 11:
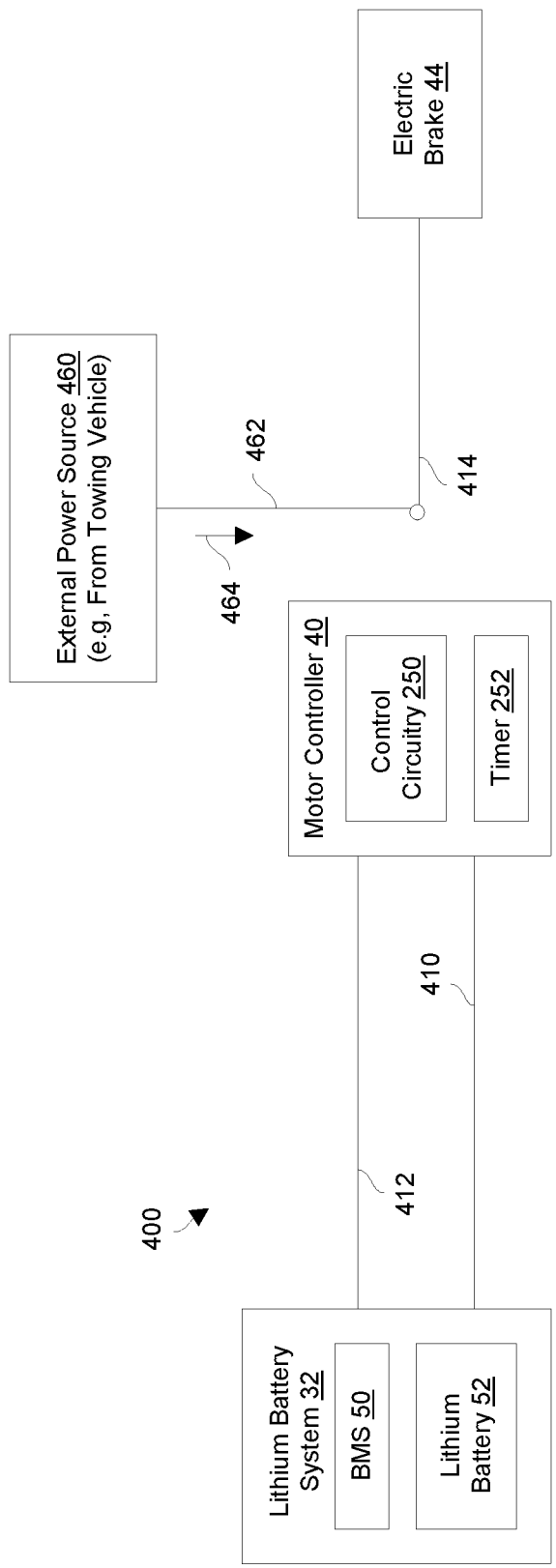
FIG. 11 is a block diagram of particular components of the utility vehicle during a third towing situation in accordance with some example embodiments.

FIGS. 8 through 11 show various techniques for releasing the electric brake 44 (e.g., to tow the utility vehicle 20). FIG. 8 shows one brake release technique which involves communication between the motor controller 40 and the BMS 50 in accordance with some embodiments. FIG. 9 shows a procedure which is performed by the motor controller 40 when releasing the electric brake 44 in accordance with some embodiments. FIG. 10 shows another brake release technique which involves wiring the BMS 50 without involving the motor controller 40 in accordance with some embodiments. FIG. 11 shows yet another brake release technique which involves wiring the electric brake 44 without involving the BMS 50 in accordance with some embodiments.

As shown in FIG. 8, the motor controller 40 includes control circuitry 250 and a timer 252. Additionally, the motor controller 40 couples with various components of the utility vehicle 20 via pathways 400 (also see the cables 38 in FIG. 1). In some embodiments, such components include a tow switch 402 (e.g., a dedicated run/tow switch under a hinged seat of the utility vehicle 20, a park brake release set of jumpers, etc.), a motion sensor 404, the lithium battery system 32, and the electric brake 44. In some embodiments, the motor controller 40 connects with the lithium battery system 32 via a pathway 410 (e.g., a CAN bus) and a power bus 412. Additionally, in some embodiments, the motor controller 40 connects with the electric brake 44 via an electric brake path 414.

During operation, suppose that the user wishes to release the electric brake 44 in order to tow the utility vehicle 20. To this end and in accordance with some embodiments, the user switches the tow switch 402 from a "non-tow mode" position to a "tow mode" position. Such activity provides a tow signal 420 to the control circuitry 250 of the motor controller 40 which, in turn, starts the timer 252 and energizes the electric brake 44 by providing a power signal 422 from lithium battery system 32 to the electric brake 44 thus enabling the electric motor 42 (FIG. 3) to turn and the utility vehicle 20 to roll.

Additionally, in some embodiments, the control circuitry 250 of the motor controller 40 sends a communication 70 (e.g., a particular CAN message) to the lithium battery system 32 directing the BMS 50 to stay awake because the utility vehicle 20 is now in tow mode, and the BMS 50 responds by maintaining closure of the contactor 106 (e.g., by continuing to output the actuation signal 136). Accordingly, the lithium battery system 32 continues to provide access to the power signal 422 on the power bus 412, and the motor controller 40 is able to deliver that power signal 422 to the electric brake 44 through the electric brake path 414 to disengage the electric brake 44.

In some embodiments, the control circuitry 250 operates the timer 252 to measure the time that elapses without sensing vehicle motion. That is, each time the control circuitry 250 receives a motion signal 424 from the motion sensor 404 (FIG. 8), the control circuitry 250 resets the timer 252 as well as sends a communication 70 to the lithium battery system 32 directing the BMS 50 to continue to keep the contactor 106 closed (i.e., directing the BMS 50 to stay awake).

However, in some embodiments, if the timer 252 ultimately expires (e.g., counts to a predefined time limit) due to lack of sensed vehicle motion, the control circuitry 250 determines that a timeout event has occurred and sends a different communication 70 (e.g., a different CAN message) to the lithium battery system 32 directing the BMS 50 to go to sleep. In response to this communication 70, the BMS 50 terminates output of the actuation signal 136 (FIG. 3) thus enabling the contactor 106 to spring back to its original open position. Accordingly, in some embodiments, the lithium battery system 32 terminates output of the power signal 422 and goes to sleep thus preventing further discharging of the lithium battery 52. As a result, the motor controller 40 goes to sleep and the electric brake 44 re-engages with the motor 42 thus preventing the utility vehicle 20 from moving.

In accordance with some embodiments, an example suitable amount of time for the predefined time out limit is an amount of time within the range of 15 minutes to 60 minutes (e.g., 15 minutes, 30 minutes, 45 minutes, etc.). Accordingly, the lithium battery 52 is not allowed to excessively drain in the event that the user forgets to turn the tow switch 402 from the "tow mode" position back to the "non-tow mode" position.

FIG. 9 shows a procedure 430 which is performed by the motor controller 40 to control electrical access to the lithium battery when towing the utility vehicle 20.

At 432, the motor controller 40 signals the lithium BMS to continue to provide electrical access to a lithium battery of the utility vehicle in response to a tow signal from a tow switch of the utility vehicle. Accordingly, the motor controller 40 is able to then energize the electric brake thus releasing the electric brake. For example, the user may switch the tow switch from the "non-tow mode" position to the "tow mode" position. In some arrangements, the motor controller 40 directs the BMS to stay awake via communications 70 on a communications pathway 410.

As mentioned earlier, the electric brake (i) provides mechanical resistance which inhibits a motor of the utility vehicle from turning when the electric brake is unpowered and (ii) removes the mechanical resistance to allow the motor of the utility vehicle to turn when power is provided to the electric brake. Accordingly, the electric brake disengages in response to the user actuating the tow switch to the "tow mode" position and the user is able to then tow the utility vehicle 20.

At 434, the motor controller 40 signals the lithium BMS to continue providing electrical access to the lithium battery of the utility vehicle 20 while sensing motion of the utility vehicle 20. Here, in accordance with some embodiments, the motor controller 40 may routinely communicate with the BMS via the communications path 410. As long as the motor controller 40 continues to sense motion of the utility vehicle 20 before timing out (e.g., by operating the internal timer 252), the motor controller 40 continues to direct the BMS to keep the contactor of the BMS closed.

At 436, the motor controller 40 signals the lithium BMS to discontinue providing electrical access to the lithium battery when no motion of the utility vehicle has been sensed for a predefined amount of time. Here, in accordance with some embodiments, the motor controller 40 times out due to the lack of sensing motion from a motion sensor. Accordingly, in accordance with some embodiments, the motor controller 40 sends a different communication to the BMS that directs the BMS to allow the contactor to open and go to sleep. As a result, the lithium battery is safely disconnected thus preventing further discharge.

As shown in FIG. 10 and as an alternative to the user switching the tow switch 402 from the "normal" position to the "brake release" position in order to tow the utility vehicle 20, the user may wire the lithium battery system 32 to the electric brake 44 without involving the motor controller 40 in accordance with some embodiments. Along these lines, the user rearranges certain wiring so that the lithium battery 52 provides the power signal 412 to the electric brake 44 to disengage the electric brake 44 from the motor 42 to enable the utility vehicle 20 to roll freely. In some arrangements, such pathway reconfiguring is represented and embodied by the park brake release switch 290 in FIG. 5.

Here, wiring paths 440, 442 are provided to direct the BMS 50 to close the contactor 106 and thus provide electrical access to the lithium battery 52. In some embodiments, such wiring may involve addition or modification of particular jumpers, connectors, and/or wires that normally provide parts of the regular signal pathways 400 (e.g., compare FIG. 10 to FIG. 8). However, in this alternative configuration, the lithium battery system 32 outputs the power signal 422 to the electric brake 44 by passing the motor controller 40, e.g., by tapping into the lithium battery system 32 itself to obtain a control signal 450 that feeds back to the lithium battery system 32 to direct the BMS 50 to close the contactor 106.

It should be understood that, in some embodiments, the control logic 130 within the lithium battery system 32 (FIG. 3) continues to protect the lithium battery 52 against being over-discharged. In some embodiments, the control logic 130 activates its own timer 132 and the timer 132 may timeout after a predefined amount of time if not reset (also see FIG. 3).

As shown in FIG. 11 and as yet another alternative, the user may couple an external power source 460 with the electric brake 44 in accordance with some embodiments thus enabling the user to release the electric brake 44 without involving the BMS 50. Along these lines, the user attaches the electric brake 44 to the external power source 460 via a wiring harness or umbilical cord 462. With the wiring harness 462 properly in place, the external power source 460 outputs an external power signal 464 to the electric brake 44 which disengages the electric brake 44 in accordance with some embodiments thus enabling the electric motor 42 (FIG. 3) to turn. With the electric brake 44 energized via external power, the user is now able to move the utility vehicle 20.

It should be understood that since the lithium battery system 32 and the motor controller 40 are not involved in this third alternative, both the lithium battery system 32 and the motor controller 40 may remain asleep. Thus, there is no risk of over-discharging the lithium battery 52.

Further Details

As described above, improved techniques are directed to electronically controlling a lithium BMS 50 of a utility vehicle 20 in response to a tow signal (i.e., switching of the tow switch 402). In some embodiments, when control circuitry 250 of the utility vehicle 20 receives the tow signal, the control circuitry 250 directs the lithium BMS 50 to maintain closure of its contactor 106 and provides power from a lithium battery 52 to an electric brake 44 of the utility vehicle 20. In response, the electric brake 44 releases (or disengages) thus enabling the utility vehicle 20 to move without mechanical resistance from the electric brake 44 (e.g., to be towed). In some embodiments, if the control circuitry 250 does not detect vehicle motion for a predefined amount of time, the control circuitry 250 directs the lithium BMS 50 to open its contactor 106 thus terminating power from the lithium battery 52 to the electric brake 44 causing the electric brake 44 to re-engage. With the contactor 106 now open, there is no further discharging of the lithium battery 52. As a result, such operation robustly and reliably prevents the lithium battery 52 from becoming over-discharged thus safeguarding the lithium battery 52 against becoming unstable.

While various embodiments of the present disclosure have been particularly shown and described, it will be understood by those skilled in the art that various changes in form and details may be made therein without departing from the spirit and scope of the present disclosure as defined by the appended claims.

In accordance with some arrangements and as disclosed above, it should be understood that the BMS 50 has the ability to disconnect the lithium battery 52 from loads if unsafe conditions are sensed. The disconnect mechanism is the contactor 106 which consumes energy when engaged. To conserve energy, the BMS 50 disconnects the lithium battery 52 after some timeout period. A wakeup signal is required to reconnect the lithium battery 52 for charging and normal use. That is, the lithium vehicle control system wakeups the BMS 50 to use the utility vehicle 20. Such a wakeup is accomplished without additional operator input.

In some embodiments, the BMS 50 and motor controller 40 routinely communicate (e.g., over the CAN bus). Accordingly, the BMS 50 understands the current status of the motor controller 40 and vice versa. Additionally, as mentioned earlier, the BMS 50 monitors the status of a variety of switch inputs, e.g., a maintenance switch, a keyed switch, a pedal switch, etc.

During operation, the BMS 50 disconnects itself from all electrical loads on the utility vehicle 20 by opening its contactor 106. Events that cause the BMS 50 to close its contactor 106 may be referred to as wakeup events, or simply wakeups. The BMS 50 of some embodiments includes multiple inputs for wakeup signals. Along these lines, users may expect the utility vehicle 20 to go when the key is on and the pedal is pressed—whether the utility vehicle 20 has sat for a long time or not. Accordingly, the maintenance switch, the keyed switch, and the throttle pedal switch are all capable of waking up the BMS 50 of some embodiments.

In some embodiments, the BMS 50 may be woken by closing the keyed switch 270. In a particular embodiment, after four hours of inactivity, the BMS 50 goes back to sleep. It can be re-awoken by cycling the keyed switch 270, or pressing the throttle pedal 280. A "towing" mode is entered by closing the tow switch 402. This maintains power to the electric brake 44 (release) until the motor controller 40 senses a predefined amount of time of inactivity (e.g., 30 minutes). That is, the motor controller 40 signals the BMS 50 that tow mode is active, and later may assert another signal when tow mode times out. In some embodiments, status bits within the communication 70 sent from the motor controller 40 to the BMS 50 inform the BMS 50 whether the utility vehicle 20 is in tow mode and whether the timer has timed out. The BMS 50 stay awakes while tow mode is active, and goes to sleep shortly after it times out. This prevents the BMS 50 from opening the contactor 106, thus releasing the electric brake 44 while the utility vehicle 20 is being towed.

In some arrangements, there are two pairs of brake release connectors that can be swapped to power (release) the electric brake 44 directly from the lithium battery 52. This allows towing of the utility vehicle 20 when the motor controller 40 is not functional. The BMS 50 goes back to sleep after a brake release timeout period, or after the brake release connectors are returned to their normal operating positions.

In some embodiments, the same BMS 50 may support operation of different types of motor controllers 40. To this end, the motor controller 40 of some embodiments sends a message (e.g., a CAN message) to the BMS 50 that includes controller type. Upon receipt, the BMS 50 of some embodiments stores the controller type in non-volatile memory. The BMS 50 uses the controller type to determine timeout values, and responses to wakeup signals. The first time the BMS 50 is connected to a different type motor controller 40, the BMS 50 may not wakeup exactly as desired. To minimize the differences between wakeup protocols, wakeup signals may be re-assigned. For example, the BMS' first wakeup signal may be connected to the keyed switch on for a first controller type, and the maintenance switch on a second controller type. Similarly, the second wakeup signal may be connected to the throttle pedal for the first controller type and the keyed switch for the second controller type. Furthermore, the third wakeup signal may be connected to the park brake release connectors for the first controller type and the throttle pedal switch for the second controller type. These input assignments minimize the logic differences between wakeup. The most common wakeup methods of turning on the first controller type key switch and the second controller type maintenance switch will work properly regardless of the vehicle type memorized by the BMS 50. As long as this wakeup happens once, the BMS 50 will continue to wakeup and sleep properly until it is transferred to another utility vehicle 20 that uses the other controller type.

When the charger is plugged into the utility vehicle 20, charging initiates regardless of whether the BMS 50 is asleep or awake. If the BMS 50 is awake, plugging in the charger asserts a charger interlock signal from the charge receptacle to the motor controller 40. The motor controller 40 may be configured to send a signal to the BMS 50 informing the BMS 50 that the charger is plugged in. For example, in some embodiments, the motor controller 40 may inform the BMS 50 that the charger is plugged in via a status bit in a message, such as a CAN message.

The BMS 50, in some embodiments, may be configured in response to the signal from the motor controller 40 to activate a charging mode. In these embodiments, the BMS 50 then sets a signal (e.g., a PWM signal) appropriately (when not charging, the BMS 50 sets the PWM signal to a fault mode as a failsafe). Charging can then take place. The BMS 50 stays awake until charging is complete, and goes to sleep shortly after charging is complete.

In some embodiments, if the charger is plugged into a utility vehicle 20 where the BMS 50 is asleep, then the charger provides power to the vehicle's electrical system. This wakes up the BMS 50 and motor controller 40. If the BMS 50 receives a communication (e.g., a CAN message) from the motor controller 40 with the charging status bit set, then it will close its contactor 106 and set the signal (e.g., the PWM signal) appropriately. Charging then commences.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event).

Additionally, it should be understood that a variety of different types of motion sensing circuits are suitable for use to sense vehicle motion (also see the motion sensor 404 in FIG. 8). Examples of suitable motion sensing circuits include current sensors, global navigation satellite system sensors, and so on. In some embodiments, a global positioning system (GPS) sensor is used to determine a change in position of the vehicle. Such modifications and enhancements are intended to belong to various embodiments of the disclosure.

What is claimed is:

1. A motion control system that controls movement of a utility vehicle, the motion control system comprising:
    an electric brake configured to (i) provide mechanical resistance which inhibits a motor of the utility vehicle from turning when the electric brake is unpowered and (ii) remove the mechanical resistance to allow the motor of the utility vehicle to turn when power is provided to the electric brake;
    a lithium battery management system (BMS) having a contactor configured to close to provide electrical access to a lithium battery and open to remove electrical access to the lithium battery; and
    control circuitry coupled with the electric brake and the lithium BMS, the control circuitry being configured to direct the lithium BMS to maintain closure of the contactor to provide power from the lithium battery to the electric brake in response to receipt of a tow signal.

2. A motion control system as in claim 1 wherein the control circuitry is constructed and arranged to: while receiving the tow signal, (i) sense whether the utility vehicle is in motion and (ii) direct the lithium BMS to open the contactor after a predefined amount of time elapses without sensing motion of the utility vehicle.

3. A motion control system as in claim 2 wherein the control circuitry includes:
    a motion sensor,
    a timer constructed and arranged to expire upon reaching the predefined amount of time, and
    control logic coupled with the motion sensor and the timer; and
    wherein, while the control logic receives the tow signal, the control logic is configured to:
    reset the timer upon sensing motion of the utility vehicle via the motion sensor,
    output a first control signal to the lithium BMS while the timer has not expired, and
    output a second control signal to the lithium BMS in response to expiration of the timer, the second control signal being different from the first control signal.

4. A motion control system as in claim 3 wherein the first control signal is configured to direct the lithium BMS to maintain closure of the contactor; and
    wherein the second control signal is configured to direct the lithium BMS to open the contactor.

5. A motion control system as in claim 4 wherein the lithium BMS and the control circuitry are configured to electronically communicate through a controller area network (CAN) bus;
    wherein the control circuitry is constructed and arranged to send, as the first control signal a first CAN message to the lithium BMS; and
    wherein the control circuitry is constructed and arranged to send, as the second control signal a second CAN message to the lithium BMS, the second CAN message being different from the first CAN message.

6. A motion control system as in claim 5 wherein the control circuitry is configured to periodically send the first CAN message to the lithium BMS while the control circuitry receives the tow signal and the utility vehicle is in motion.

7. A motion control system as in claim 5 wherein a tow switch of the utility vehicle is configured to output the tow signal to the control circuitry when the tow switch is set to a first position, and outputs a run signal in place of the tow signal to the control circuitry when the tow switch is set to a second position that is different from the first position.

8. A motion control system as in claim 7 wherein the control circuitry is configured to send a third CAN message to the lithium BMS when the tow switch is set to the second position, the third CAN message being different from the first and second CAN messages.

9. A motion control system as in claim 7 wherein the control circuitry is configured to: (i) direct the motor to turn in response to actuation of an accelerator pedal of the utility vehicle while the tow switch is set to the second position, and (ii) not direct the motor to turn in response to actuation of the accelerator pedal of the utility vehicle while the tow switch is set to the first position.

10. A motion control system as in claim 1 wherein the lithium BMS is constructed and arranged to automatically open the contactor in response to detection of a current amount of charge in the lithium battery falling to a predefined minimum charge threshold.

11. A motion control system as in claim 10 wherein the lithium BMS is configured to automatically open the contactor when the current amount of charge in the lithium battery has fallen below the predefined minimum charge threshold even when the control circuitry directs the lithium BMS to maintain closure of the contactor.

12. A motion control system as in claim 10 wherein the lithium BMS is configured to maintain closure of the contactor while the current amount of charge in the lithium battery is above the predefined minimum charge threshold and while the control circuitry is disconnected from the lithium BMS and replaced with a bypass connection.

13. A motion control system as in claim 1 wherein the lithium BMS is configured to open the contactor while an external power source provides power to the electric brake to remove the mechanical resistance allowing the motor of the utility vehicle to turn.

14. A utility vehicle, comprising:
    a utility vehicle body;
    a lithium battery supported by the utility vehicle body;
    a motor supported by the utility vehicle body; and
    a motion control system configured to control movement of a utility vehicle, the motion control system including:
    an electric brake configured to (i) provide mechanical resistance which inhibits the motor from turning when the electric brake is unpowered and (ii) remove the mechanical resistance to allow the motor to turn when power is provided to the electric brake,
    a lithium battery management system (BMS) having a contactor configured to close to provide electrical access to the lithium battery and open to remove electrical access to the lithium battery, and
    control circuitry coupled with the electric brake and the lithium BMS, the control circuitry being configured to direct the lithium BMS to maintain closure of the contactor to provide power from the lithium battery to the electric brake in response to receipt of a tow signal.

15. A utility vehicle as in claim 14, further comprising:
a tow switch configured to provide the tow signal,
wherein the control circuitry is constructed and arranged to:
while receiving the tow signal from the tow switch, (i) sense whether the utility vehicle is in motion and (ii) direct the lithium BMS to open the contactor in response to a predefined amount of time elapsing without sensing motion of the utility vehicle.

16. A utility vehicle as in claim 15 wherein the lithium BMS is constructed and arranged to automatically open the contactor in response to detection of a current amount of charge in the lithium battery falling to a predefined minimum charge threshold.

17. A utility vehicle as in claim 16 wherein the lithium BMS is configured to maintain closure of the contactor while the current amount of charge in the lithium battery is above the predefined minimum charge threshold and while the control circuitry is disconnected from the lithium BMS and replaced with a bypass connection.

18. A utility vehicle as in claim 16 wherein the lithium BMS is configured to open the contactor while an external power source provides power to the electric brake to remove the mechanical resistance allowing the motor of the utility vehicle to turn.

19. In a utility vehicle, a method of controlling lithium battery access, the method comprising:
signaling a lithium battery management system (BMS) to provide an electric brake with electrical access to a lithium battery of the utility vehicle in response to a tow signal from a tow switch of the utility vehicle, the electric brake being configured to (i) provide mechanical resistance which inhibits a motor of the utility vehicle from turning when the electric brake is unpowered and (ii) remove the mechanical resistance to allow the motor of the utility vehicle to turn when power is provided to the electric brake;
signaling the lithium BMS to continue providing electrical access to the lithium battery of the utility vehicle while sensing motion of the utility vehicle; and
signaling the lithium BMS to discontinue providing electrical access to the lithium battery when no motion of the utility vehicle has been sensed for a predefined amount of time.

\* \* \* \* \*